(12) United States Patent
Lv et al.

(10) Patent No.: US 10,061,155 B2
(45) Date of Patent: Aug. 28, 2018

(54) POLARIZER, DISPLAY PANEL AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Kui Lv, Beijing (CN); Kang Xiang, Beijing (CN); Xiao Guo, Beijing (CN); Chen Wang, Beijing (CN); Xinxia Zhang, Beijing (CN); Qun Li, Beijing (CN); Fengzhen Lv, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/235,003

(22) Filed: Aug. 11, 2016

(65) Prior Publication Data
US 2017/0199422 A1   Jul. 13, 2017

(30) Foreign Application Priority Data

Jan. 13, 2016  (CN) .......................... 2016 1 0020560

(51) Int. Cl.
*G02F 1/1335*   (2006.01)
*G02B 5/30*   (2006.01)

(52) U.S. Cl.
CPC ..... *G02F 1/133528* (2013.01); *G02B 5/3058* (2013.01); *G02F 2001/133548* (2013.01)

(58) Field of Classification Search
CPC ............. G02F 1/133528; G02F 5/3058; G02F 2001/133548
See application file for complete search history.

(56) References Cited

U.S. PATENT DOCUMENTS 6,809,783 B2   10/2004  Noh et al.
2005/0253977 A1   11/2005  Choi
(Continued)

FOREIGN PATENT DOCUMENTS

CN   1696787 A   11/2005
CN   102099716 A   6/2011
(Continued)

OTHER PUBLICATIONS

Office Action received for Chinese Patent Application No. 201610020560.2, dated Feb. 5, 2018, 16 pages (9 pages of English Translation and 7 pages of Office Action).

*Primary Examiner* — Kevin Quarterman
(74) *Attorney, Agent, or Firm* — Womble Bond Dickinson (US) LLP

(57) ABSTRACT

Embodiments of the present invention disclose a polarizer, a display panel and a display device. A flexible electrode layer in the polarizer is located between an adjacent polarizing layer and one functional film layer or located between two adjacent functional film layers. Specifically, the polarizer provided by embodiments of the present invention adds a flexible electrode layer in the structure of the polarizer, thereby enabling the polarizer to have both the optical function of a conventional polarizer and the additional flexible electrode function. When the multifunctional polarizer is applied in a display device, the functions of electrostatic shielding and protecting the display device can be achieved. Particularly, when the multifunctional polarizer is applied in an In Plane Swtiching (IPS) liquid crystal display device, it can replace the shielding electrode structure at the color film substrate side so as to implement the function of electrostatic shielding.

11 Claims, 2 Drawing Sheets

(56) References Cited

U.S. PATENT DOCUMENTS

| | | | |
|---|---|---|---|
| 2006/0176423 A1* | 8/2006 | Lee | G02B 5/3033 |
| | | | 349/96 |
| 2007/0070263 A1* | 3/2007 | Nishimura | G02F 1/133528 |
| | | | 349/58 |
| 2011/0181813 A1 | 7/2011 | Kim et al. | |
| 2014/0146276 A1 | 5/2014 | Park | |
| 2015/0070603 A1 | 3/2015 | Yamasaki et al. | |

FOREIGN PATENT DOCUMENTS

| | | |
|---|---|---|
| CN | 102981310 A | 3/2013 |
| CN | 104422979 A | 3/2015 |
| JP | 3153142 B2 | 4/2001 |

* cited by examiner

POLARIZER, DISPLAY PANEL AND DISPLAY DEVICE

RELATED APPLICATIONS

The present application claims the benefit of Chinese Patent Application No. 201610020560.2, filed on Jan. 13, 2016, the entire disclosure of which is incorporated herein by reference.

TECHNICAL FIELD

The present invention relates to the field of display technology, particularly to a polarizer, a display panel and a display device.

BACKGROUND

In the prior art, the polarizer is an important optical component of liquid crystal display (LCD). During displaying of LCD, with the polarizer/analyzer function of the polarizer, the display effect is finally achieved by converting the optical effect of the liquid crystal layer under different electric fields into light and shade contrast.

As an important and conventional optical component, the basic structure of the polarizer has been relatively mature after years of development. Meanwhile different requirements based on product development also enable the polarizer to have various functions, for example, the polarizer has the functions of wide view angle compensation, retardation compensation etc. However, the development of the polarizer is always limited in the aspect of optical device application.

SUMMARY

Embodiments of the present invention provides a polarizer, a display panel and a display device, for enabling the polarizer to further have the function of non-optical devices while having the optical function of the conventional optical polarizer.

Embodiments of the present invention provide a polarizer. The polarizer comprises a polarizing layer, a flexible electrode layer and at least one functional film layer arranged in stack; the flexible electrode layer is located between the adjacent polarizing layer and one of the functional film layers, or located between two adjacent functional film layers.

In a possible implementation, in the polarizer provided by embodiments of the present invention, the at least one functional film layer comprises: a bonding layer, and a first protective layer arranged between the bonding layer and the polarizing layer, the flexible electrode layer is located between the first protective layer and the bonding layer.

In a possible implementation, in the polarizer provided by embodiments of the present invention, a material of the flexible electrode layer is a polymer based transparent conductive material.

In a possible implementation, in the polarizer provided by embodiments of the present invention, the polymer based transparent conductive material is any one of the three materials: polythiophene superpolymer transparent conductive material, polyaniline superpolymer transparent conductive material, and ultrafine conductive particles/ultrafine conductive fiber filled polymer transparent conductive material. In a possible implementation, in the polarizer provided by embodiments of the present invention, the at least one functional film layer further comprises: a second protective layer, a third protective layer, a surface treatment layer and a release film; the first protective layer and the second protective layer are located at two sides of the polarizing layer respectively; the surface treatment layer is located between the second protective layer and the third protective layer; and the release film is located at a side of the bonding layer away from the flexible electrode layer.

In a possible implementation, in the polarizer provided by embodiments of the present invention, the first protective layer and the second protective layer are triacetate fiber films.

Embodiments of the present invention provides a display panel. The display panel comprises: an array substrate, a color film substrate, a liquid crystal layer, a first polarizer and a second polarizer; the liquid crystal layer is located between the array substrate and the color film layer; the first polarizer is located at a side of the array substrate away from the liquid crystal layer; the second polarizer is located at a side of the color film substrate away from the liquid crystal layer; the second polarizer is the polarizer provided by embodiments of the present invention; and the flexible electrode layer in the second polarizer is connected with conductive adhesive in a border area of the display panel.

In a possible implementation, in the display panel provided by embodiments of the present invention, the first polarizer is the polarizer provided by embodiments of the present invention; and the flexible electrode layer in the first polarizer is connected with conductive adhesive in the border area of the display panel.

Embodiments of the present invention provide a display device comprising the display panel provided by embodiments of the present invention.

Embodiments of the present invention provide a polarizer, a display panel and a display device. The polarizer comprises: a polarizing layer, a flexible electrode layer and a plurality of functional film layers arranged in stack; the flexible electrode layer is located between the adjacent polarizing layer and the functional film layer or located between two adjacent functional film layers. Specifically, the polarizer provided by embodiments of the present invention adds a flexible electrode layer in the structure of the polarizer, thereby enabling the polarizer to have both the optical function of a conventional polarizer and the additional flexible electrode function. When the multifunctional polarizer is applied in a display device, the functions of electrostatic shielding and protecting the display device can be achieved. Particularly, when the multifunctional polarizer is applied in an In Plane Swtiching (IPS) liquid crystal display device, it can replace the shielding electrode structure at the color film substrate side so as to implement the function of electrostatic shielding. In this way, the manufacturing process of the IPS liquid crystal display device can be simplified effectively; meanwhile, since in the existing IPS liquid crystal display device, the shielding electrode structure at the color film substrate side is exposed on the surface of the display panel, the shielding electrode is apt to be damaged due to surface scratch of the display panel. In the polarizer provided by embodiments of the present invention, by arranging the flexible electrode layer between the adjacent polarizing layer and the functional film layer or between two adjacent functional film layers, the function of electrostatic shielding can be achieved, damage to the shielding electrode structure caused by surface scratch of the display panel can also be reduced.

DETAILED DESCRIPTION OF THE INVENTION

In the following, the technical solutions in embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

Figure 1A:
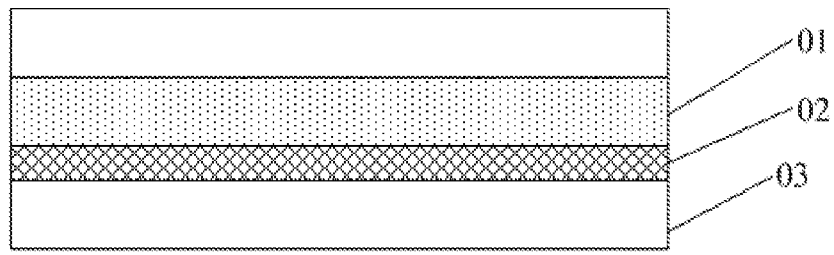
FIG. 1a and FIG. 1b are structural schematic diagrams of a polarizer provided by embodiments of the present invention respectively.
Figure 1B:
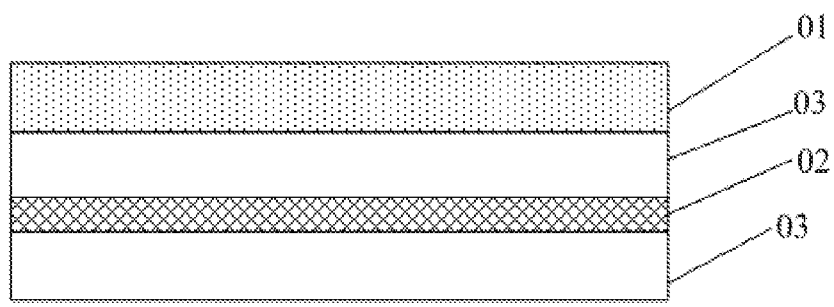

Embodiments of the present invention provide a polarizer; as shown in FIGS. 1a and 1b, the polarizer may comprise: a polarizing layer 01, a flexible electrode layer 02 and at least one functional film layer 03 arranged in stack; the flexible electrode layer 02 is located between the adjacent polarizing layer 01 and one functional film layer 03 (as shown in FIG. 1a), or located between two adjacent functional film layers 03 (as shown in FIG. 1b).

The polarizer provided by embodiments of the present invention adds a flexible electrode layer in the structure of the polarizer, thereby enabling the polarizer to have both the optical function of a conventional polarizer and the additional flexible electrode function. When the multifunctional polarizer is applied in a display device, the functions of electrostatic shielding and protecting the display device can be achieved. Particularly, when the multifunctional polarizer is applied in an In Plane Swtiching (IPS) liquid crystal display device, it can replace the shielding electrode structure at the color film substrate side so as to implement the function of electrostatic shielding. In this way, the manufacturing process of the IPS liquid crystal display device can be simplified effectively; meanwhile, since in the existing IPS liquid crystal display device, the shielding electrode structure at the color film substrate side is exposed on the surface of the display panel, the shielding electrode is apt to be damaged due to surface scratch of the display panel. In the polarizer provided by embodiments of the present invention, by arranging the flexible electrode layer between the adjacent polarizing layer and the functional film layer or between two adjacent functional film layers, the function of electrostatic shielding can be achieved, damage to the shielding electrode structure caused by surface scratch of the display panel can also be reduced.

Figure 2:
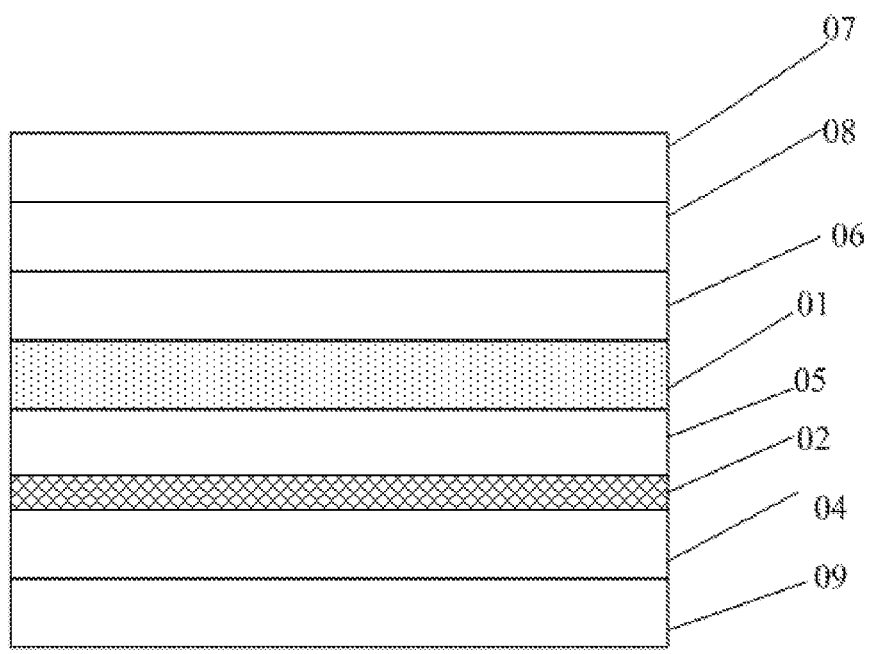
FIG. 2 is a structural schematic diagram of a polarizer provided by another embodiment of the present invention.

In a specific implementation, in a polarizer provided by another embodiment of the present invention, as shown in FIG. 2, the at least one functional film layer may comprise: a bonding layer 04, and a first protective layer 05 arranged between the bonding layer 04 and the polarizing layer 01; the flexible electrode layer 02 is located between the first protective layer 05 and the bonding layer 04. Specifically, in the polarizer provided by the embodiment of the present invention, the flexible electrode layer can be arranged between the first protective layer and the bonding layer. In this way, the polarizer can have a better transparency, and the bonding between the flexible electrode layer and the adjacent layers can be relatively tight; meanwhile, compared to the prior art in which the shielding electrode structure is exposed on the surface of the display panel, damage to the shielding electrode structure caused by scratch of the display panel can be avoided.

In a specific implementation, in the polarizer provided by embodiments of the present invention, the material of the flexible electrode layer can be a polymer based transparent conductive material. Specifically, in the polarizer provided by embodiments of the present invention, the material of the flexible electrode layer can use a polymer based transparent conductive material. The flexible electrode layer made of the polymer based transparent conductive material has the characteristics of flexibility, transparency and conductivity, and can ensure the polarizer to have a better transparency, meanwhile enable the polarizer to have the function of flexible electrode. In this way, the polarizer becomes a multifunctional polarizer, which can also have the function of electrostatic shielding while having the optical function of the conventional polarizer. When applying it in a display device (particularly the IPS liquid crystal display), the shielding electrode structure at the color film substrate side is not required, simplifying the manufacturing process of the liquid crystal display and avoiding damage to the shielding electrode structure exposed on the surface of the display panel caused by surface scratch of the display panel.

In a specific implementation, in the polarizer provided by embodiments of the present invention, the polymer based transparent conductive material can be any one of the three materials: polythiophene superpolymer transparent conductive material, polyaniline superpolymer transparent conductive material, and ultrafine conductive particles/ultrafine conductive fiber filled polymer transparent conductive material. Specifically, in the polarizer provided by embodiments of the present invention, the polymer based transparent conductive material for manufacturing the flexible electrode layer can be any one of the three materials: polythiophene superpolymer transparent conductive material, polyaniline superpolymer transparent conductive material, and ultrafine conductive particles/ultrafine conductive fiber filled polymer transparent conductive material. Since the polythiophene superpolymer transparent conductive material has the advantages of low resistivity and high transmittance, using the polythiophene superpolymer transparent conductive material to manufacture the flexible electrode layer can ensure the polarizer to have a relatively high transmittance and realize the function of electrostatic shielding for the polarizer. Certainly, other achievable materials can also be selected to manufacture the flexible electrode layer. The selection of the flexible electrode layer material is based on the actual production process of the polarizer and makes reference to different optical specification requirements. The material of the flexible electrode layer is selected according to actual process based on intrinsic material structure of different types of polarizer, which will not be defined here.

In addition, it should be noted that the flexible electrode layer using different materials would also have an influence on the position of the flexible electrode layer in the polarizer structure; hence, the actual position of the flexible electrode layer in the polarizer structure can be adjusted based on optimization of the actual production process of the polarizer. For example, when the flexible electrode layer is manufactured with the polythiophene superpolymer transparent conductive material and the polyaniline superpolymer transparent conductive material, the flexible electrode layer can be arranged between any two adjacent layer structures in the polarizer structure; whereas when the flexible electrode layer is manufactured with the ultrafine conductive particles/ultrafine conductive fiber filled polymer transparent conductive material, the flexible electrode layer should not be arranged between the polarizing layer and its adjacent functional layer, since conventional polarizing layer material may be easily hydrolyzed and the ultrafine conductive particles/ultrafine conductive fiber filled polymer transparent conductive material may be easily melted with the polarizing layer material, thereby influencing the function of the polarizer.

In a specific implementation, in the polarizer provided by embodiments of the present invention, as shown in FIG. 2, the at least one functional film layer may further comprise: a second protective layer 06, a third protective layer 07, a surface treatment layer 08 and a release film 09; the first protective layer 05 and the second protective layer 06 are located at two sides of the polarizing layer 01 respectively; the surface treatment layer 08 is located between the second protective layer 06 and the third protective layer 07; and the release film 09 is located at a side of the bonding layer 04 away from the flexible electrode layer 02. Specifically, the specific structure of the polarizer provided by embodiments of the present invention is as shown in FIG. 2, except for the flexible electrode layer, the structures and functions of other functional film layers are same as the prior art, which will not be repeated herein. Arranging the flexible electrode layer between the bonding layer and the first protective layer can ensure the polarizer to have a better transparency; meanwhile, the bonding between the flexible electrode layer and the adjacent layers can be relatively tight. On the whole, the structure and the manufacturing process of the polarizer provided by embodiments of the present invention only needs to add a flexible electrode layer between two adjacent film layers on the basis of the structure and the manufacturing process of an original polarizer, which increases wide applicability of the present invention without increasing the complexity of the manufacturing process of the polarizer.

In a specific implementation, in the polarizer provided by embodiments of the present invention, the first protective layer and the second protective layer may be triacetate fiber films. Specifically, in the polarizer provided by embodiments of the present invention, the first protective layer and the second protective layer are triacetate fiber films; the first protective layer and the second protective layer are located at two sides of the polarizing layer for protecting the polarizing layer. The structures, materials and the functions of the first protective layer and the second protective layer are all same as the prior art, which will not be repeated herein.

Figure 3:
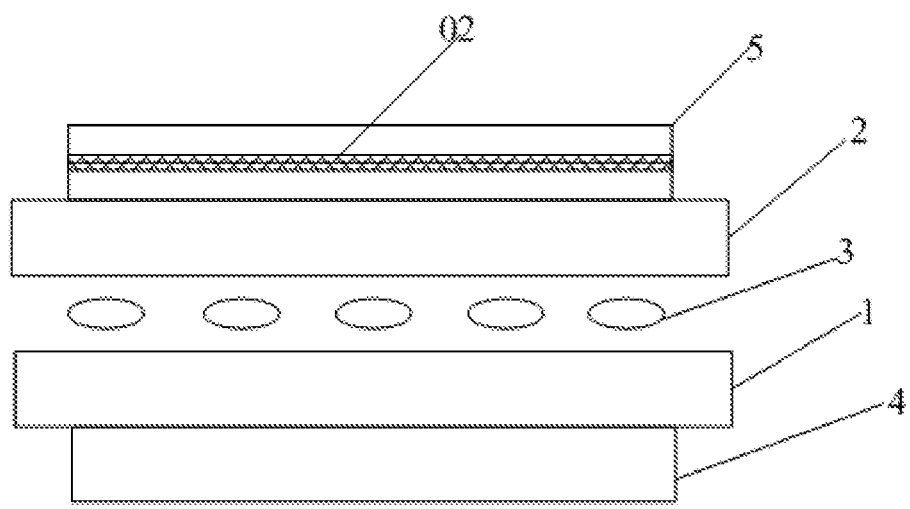
FIG. 3 is a structural schematic diagram of a liquid crystal display panel provided by embodiments of the present invention.
Figure 4:
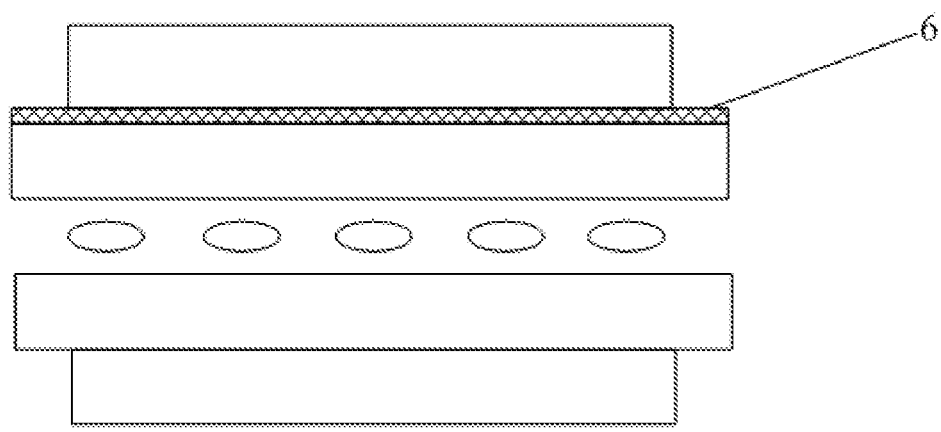
FIG. 4 is a structural schematic diagram of a liquid crystal display panel in the prior art.

Based on the same inventive concept, embodiments of the present invention provide a display panel. As shown in FIG. 3, the display panel may comprise: an array substrate 1, a color film substrate 2, a liquid crystal layer 3, a first polarizer 4 and a second polarizer 5; the liquid crystal layer 3 is located between the array substrate 1 and the color film substrate 2; the first polarizer 4 is located at a side of the array substrate 1 away from the liquid crystal layer 3; the second polarizer 5 is located at a side of the color film substrate 2 away from the liquid crystal layer 3; the second polarizer 5 is the polarizer provided by embodiments of the present invention; the flexible electrode layer 02 in the second polarizer 5 is connected with conductive adhesive in a border area of the display panel (not shown in the figure). Specifically, the polarizer provided by embodiments of the present invention can be applied in a liquid crystal display device (particularly an IPS liquid crystal display). The polarizer at the color film substrate side can be the polarizer provided by embodiments of the present invention. Since the polarizer provided by embodiments of the present invention has a flexible electrode layer, when the polarizer is applied in a liquid crystal display device, the flexible electrode layer can be connected with conductive adhesive in the border area of the liquid crystal display device, enabling the liquid crystal display device to have the electrostatic shielding function. In this way, the shielding electrode structure at the color film substrate side is not required in the IPS liquid crystal display device, simplifying the manufacturing process of the IPS liquid crystal display device, and avoiding damage to the shielding electrode structure exposed on the surface of the display panel (as shown in FIG. 4) caused by surface scratch of the display panel. FIG. 4 is a structural schematic diagram of an IPS liquid crystal display panel in the prior art. Generally, the IPS liquid crystal display device in the prior art is provided with a shielding electrode structure 6 at the color film substrate side for realizing electrostatic shielding. The shielding electrode structure is exposed on the surface of the display panel and may be easily damaged due to scratch on the display panel.

In a specific implementation, in the display panel provided by embodiments of the present invention, the first polarizer 4 may be the polarizer provided by embodiments of the present invention; the flexible electrode layer in the first polarizer 4 is connected with conductive adhesive in the border area of the display panel. Specifically, in the display panel provided by embodiments of the present invention, the polarizer at the array substrate side may also be the polarizer provided by embodiments of the present invention. In this way, the electrostatic shielding function of the liquid crystal display device can be further enhanced. Since the array substrate of the prior art typically has a shielding electrode, when the polarizer provided by embodiments of the present invention is applied on the side of the array substrate, an overlapping shielding effect can be achieved. Therefore, the liquid crystal display device applying the polarizer provided by embodiments of the present invention at both the color film substrate side and the array substrate side may have certain enhancement effect on electrostatic shielding.

Based on the same inventive concept, an embodiment of the present invention provides a display device comprising the above mentioned display panel. The display device can be any product or component with display function, such as mobile phone, tablet computer, TV, display, notebook computer, digital photo frame and navigator. The implementation of the display device can refer to the embodiments of the above mentioned display panel, which will not be repeated herein.

Embodiments of the present invention provide a polarizer, a display panel and a display device. The polarizer comprises: a polarizing layer, a flexible electrode layer and a plurality of functional film layers arranged in stack; the flexible electrode layer is located between the adjacent polarizing layer and the functional film layer or located between two adjacent functional film layers. Specifically, the polarizer provided by embodiments of the present invention adds a flexible electrode layer in the structure of the polarizer, thereby enabling the polarizer to have both the optical function of a conventional polarizer and the additional flexible electrode function. When the multifunctional polarizer is applied in a display device, the functions of electrostatic shielding and protecting the display device can be achieved. Particularly, when the multifunctional polarizer is applied in an In Plane Swtiching (IPS) liquid crystal display device, it can replace the shielding electrode structure at the color film substrate side so as to implement the function of electrostatic shielding. In this way, the manufacturing process of the IPS liquid crystal display device can be simplified effectively; meanwhile, since in the existing IPS liquid crystal display device, the shielding electrode structure at the color film substrate side is exposed on the surface of the display panel, the shielding electrode is apt to be damaged due to surface scratch of the display panel. In the polarizer provided by embodiments of the present invention, by arranging the flexible electrode layer between the adjacent polarizing layer and the functional film layer or between two adjacent functional film layers, the function of electrostatic shielding can be achieved, damage to the shielding electrode structure caused by surface scratch of the display panel can also be reduced.

Apparently, the skilled person in the art can make various modifications and variations to the present invention without departing from the spirit and the scope of the present invention. In this way, provided that these modifications and variations of the present invention belong to the scopes of the claims of the present invention and equivalent technologies thereof, the present invention also intends to encompass these modifications and variations.

What is claimed is:

1. A polarizer comprising: a polarizing layer, a flexible electrode layer and at least one functional film layer arranged in stack;
    wherein the flexible electrode layer is located between the adjacent polarizing layer and one of the functional film layers, or located between two adjacent functional film layers;
    wherein the at least one functional film layer comprises: a bonding layer, a first protective layer arranged between the bonding layer and the polarizing layer, a second protective layer, a third protective layer, a surface treatment layer and a release film;
    wherein the flexible electrode layer is located between the first protective layer and the bonding layer; the first protective layer and the second protective layer are located at two sides of the polarizing layer respectively; the surface treatment layer is located between the second protective layer and the third protective layer; and wherein the release film is located at a side of the bonding layer away from the flexible electrode layer.

2. The polarizer as claimed in claim 1, wherein a material of the flexible electrode layer is a polymer based transparent conductive material.

3. The polarizer as claimed in claim 2, wherein the polymer based transparent conductive material is any one of the three materials: polythiophene superpolymer transparent conductive material, polyaniline superpolymer transparent conductive material, and ultrafine conductive particles/ultrafine conductive fiber filled polymer transparent conductive material.

4. The polarizer as claimed in claim 1, wherein the first protective layer and the second protective layer are triacetate fiber films.

5. A display panel comprising: an array substrate, a color film substrate, a liquid crystal layer, a first polarizer and a second polarizer;
    wherein the liquid crystal layer is located between the array substrate and the color film substrate;
    wherein the first polarizer is located at a side of the array substrate away from the liquid crystal layer;
    wherein the second polarizer is located at a side of the color film substrate away from the liquid crystal layer;
    wherein the second polarizer is the polarizer as claimed in claim 1; and
    wherein the flexible electrode layer in the second polarizer is connected with conductive adhesive in a border area of the display panel.

6. The display panel as claimed in claim 5, wherein the first polarizer is the polarizer as claimed in claim 1; and wherein the flexible electrode layer in the first polarizer is connected with conductive adhesive in the border area of the display panel.

7. The display panel as claimed in claim 5, wherein a material of the flexible electrode layer is a polymer based transparent conductive material.

8. The display panel as claimed in claim 7, wherein the polymer based transparent conductive material is any one of the three materials: polythiophene superpolymer transparent conductive material, polyaniline superpolymer transparent conductive material, and ultrafine conductive particles/ultrafine conductive fiber filled polymer transparent conductive material.

9. The display panel as claimed in claim 5, wherein the first protective layer and the second protective layer are triacetate fiber films.

10. A display device, comprising the display panel as claimed in claim 5.

11. The display device as claimed in claim 10, wherein the first polarizer comprises a polarizing layer, a flexible electrode layer and at least one functional film layer arranged in stack; wherein
    the flexible electrode layer of the first polarizer is located between the polarizing layer of the first polarizer and one of the functional film layers of the first polarizer, or located between two adjacent functional film layers of the first polarizer; and wherein the flexible electrode layer in the second polarizer is connected with conductive adhesive in a border area of the display panel.

* * * * *